US005299129A

United States Patent [19]

Uchida et al.

[11] Patent Number: 5,299,129
[45] Date of Patent: Mar. 29, 1994

[54] PTO CONTROL APPARATUS FOR VEHICULAR AUTOMATIC TRANSMISSION

[75] Inventors: Takaya Uchida, Okazaki; Toshinori Murahashi, Toyota, both of Japan

[73] Assignee: Aisin Seiki Kabushiki Kaisha, Kariya, Japan

[21] Appl. No.: 673,301

[22] Filed: Mar. 22, 1991

[30] Foreign Application Priority Data

Mar. 26, 1990 [JP]  Japan ................................. 2-73485
Mar. 27, 1990 [JP]  Japan ................................. 2-75573

[51] Int. Cl.$^5$ ........................ G06F 15/50; G06F 7/70
[52] U.S. Cl. ........................ 364/424.1; 364/426.01; 74/866; 74/11
[58] Field of Search ............... 364/424.1, 426.01; 74/866, 867, 11; 180/53.6, 165

[56] References Cited

U.S. PATENT DOCUMENTS

| | | | |
|---|---|---|---|
| 3,919,806 | 11/1975 | Pluenneke et al. | 47/1.3 |
| 4,191,270 | 3/1980 | Monteith | 74/11 |
| 4,338,743 | 7/1982 | Gilmore | 47/1.3 |
| 4,610,175 | 9/1986 | Weis et al. | 74/11 |
| 4,618,016 | 10/1986 | Van der Lely | 74/11 |
| 4,671,139 | 6/1987 | Downs et al. | 364/424.1 |
| 4,920,813 | 5/1990 | Wilford | 74/11 |
| 4,933,850 | 6/1990 | Wheeler | 74/866 |
| 4,944,193 | 7/1990 | Harada et al. | 74/15.66 |
| 5,088,041 | 2/1992 | Tanaka et al. | 364/424.1 |

Primary Examiner—Thomas G. Black
Assistant Examiner—Jacques H. Louis-Jacques
Attorney, Agent, or Firm—Burns, Doane, Swecker & Mathis

[57] ABSTRACT

A control system of a power take-off (PTO) apparatus for taking off power from an automatic transmission by meshing PTO gear with drive gear of the automatic transmission includes a control unit, to which are inputted ON signal from PTO switch and vehicle-speed signal from vehicle speed detecting unit, for outputting actuating signal to actuating unit of the PTO apparatus. The control unit actuates the PTO apparatus by outputting the actuating signal to the actuating unit of the PTO apparatus in response to input of the ON signal from the PTO switch, and stops output of the actuating signal when a vehicle speed greater than a predetermined speed is detected during output of the actuating signal.

9 Claims, 7 Drawing Sheets

PTO CONTROL APPARATUS FOR VEHICULAR AUTOMATIC TRANSMISSION

RELATED ART

Special-purpose vehicles such as vehicles for environmental sanitation (garbage trucks, etc.), dump trucks and cement mixers are furnished with a PTO apparatus in which motive power serving as the motive power source of various types of mounted machinery is taken off from the power line of the vehicle. Many PTO apparatus in use are adapted to take off the motive power from the transmission of the vehicle.

An example of an automatic transmission with a conventional PTO for such a special-purpose vehicle is shown in FIG. 7, in which A represents the PTO apparatus and B a gear train of the automatic transmission to which the PTO apparatus is connected. The PTO apparatus A has a PTO gear A1 which is slid in the axial direction to mesh with a drive gear B1 attached to a drum C1 of the automatic transmission B, whereby power is taken off from an input shaft B2 of the automatic transmission and delivered to various mounted machinery from a PTO output shaft A2. There are cases where the drive gear B1 is attached to another portion of the gear train.

However, in this automatic transmission with a PTO, as will be understood from FIG. 7, the drive gear B1 coupled to the PTO apparatus A to take off the power is connected to a turbine D1 of a hydraulic-type torque converter D and rotates in unison with the turbine D1. Accordingly, the drive gear B1 is always rotating while the vehicle is travelling.

Consequently, if the PTO gear A1 is meshing with the drive gear B1, power take-off by the PTO apparatus A is possible even while the vehicle is travelling. However, in case of a dump truck or the like, operation of the PTO apparatus A during vehicle travel is extremely hazardous.

In order to deactuate the PTO apparatus A, the conventional practice is for the driver to manually switch off, at his own volition, a PTO switch provided at the driver's seat. This means that the PTO apparatus continues to operate as long as the driver does not turn off the PTO switch. This is a very dangerous situation.

Further, the conventional PTO apparatus mounted on a vehicular automatic transmission is such that a range changeover unit on the main body of the vehicular automatic transmission and a range changeover unit at the driver's seat are connected by a link or push-pull cable. Consequently, when the PTO gear A1 is meshed with the drive gear B1 of the automatic transmission to perform power take-off, the range changeover unit at the driver's seat is manually shifted to a range other than the neutral range to mesh the PTO gear A1 with the drive gear B1 of the automatic transmission, after which the range changeover unit at the driver's seat is shifted to the N range.

When the PTO gear A1 is meshed with the drive gear B1, it is necessary to mesh the PTO gear A1 after the drive gear B1 is stopped in order to prevent the gnashing of the gears and damage to the gear teeth. To this end, the PTO apparatus must be connected after the shift range of the automatic transmission is shifted to a range other than neutral and the vehicle is stopped by the vehicle brake.

In other words, in the gear train of FIG. 7, by engaging a C1 clutch or C2 clutch and fixing an output shaft B3 of the automatic transmission by the vehicle brake with the shift range being in a range other than neutral, rotation of the drive gear B1 is stopped and thereafter it is possible to mesh the PTO gear A1.

As a consequence, when the PTO apparatus is used, an operation is necessary which entails shifting the shift lever to a range other than neutral while the vehicle is at rest, turning on the PTO switch and meshing the PTO gear A1 with the drive gear B1 of the automatic transmission, and then again shifting the shift lever to the neutral range. This procedure for operating the PTO apparatus is very troublesome.

SUMMARY OF THE DISCLOSURE

Accordingly, the present invention has been devised in order to solve the aforementioned problems possessed by the conventional PTO apparatus described above.

A first object of the present invention is to provide a PTO control system of a vehicular automatic transmission equipped with a PTO, which system assures safe operation of the PTO apparatus.

A second object of the present invention is to provide a PTO control system of a vehicular automatic transmission, in which the troublesome operation of the conventional PTO apparatus is operated safely.

According to a first aspect of the present invention, the first object is attained by providing a control system of a power take-off apparatus for taking off power from an automatic transmission by meshing a PTO gear with a drive gear of the automatic transmission, comprising a PTO switch, vehicle speed detecting means, and control means, to which are inputted an ON signal from the PTO switch and a vehicle-speed signal from the vehicle speed detecting means, for outputting an actuating signal to an actuating unit of the power take-off apparatus, wherein the control means actuates the power take-off apparatus by outputting the actuating signal to the actuating unit of the power take-off apparatus in response to input of the ON signal from the PTO switch, and stops output of the actuating signal when the vehicle speed detecting means detects that vehicle speed is greater than a predetermined vehicle speed during output of the actuating signal.

In accordance with the first aspect of the invention described above, turning on the PTO switch causes the control means to output the actuating signal to the PTO actuating unit in order to actuate the PTO apparatus, thereby taking off power from the automatic transmission. However, when the vehicle speed detecting means detects that the vehicle speed has exceeded a predetermined vehicle speed during actuation of the PTO apparatus, namely when the detecting means detects that the vehicle has started traveling, the control means halts the output of the actuating signal and therefore deactuates the PTO apparatus.

In order to attain the first object according to a second aspect of the invention, the control means is so adapted that after it stops the output of the actuating signal in response to detection of vehicle speed greater than the predetermined vehicle speed during output of the actuating signal, it will continue to stop the output of the actuating signal even if the vehicle speed detecting means detects that the vehicle speed has fallen below the predetermined vehicle speed.

In accordance with this second aspect of the invention, once the output of the actuating signal has been halted to deactuate the PTO apparatus in response to vehicle travel, as described above, the control means continues to stop the output of the actuating signal even if the vehicle subsequently stops and the vehicle speed detecting means detects that the vehicle speed has fallen below the predetermined vehicle speed. As a result, the PTO apparatus will not start operating again.

If the PTO apparatus is to be actuated again, this can be accomplished by turning off the PTO switch once and then turning it on again.

In order to attain the first object according to a third aspect of the invention, the control system further comprises, in addition to the first or second aspect, rotational speed detecting means connected to the control means for detecting rotational speed of the drive gear, brake actuation detecting means connected to the control means, and shift-range detecting means connected to the control means, wherein when the rotational speed detecting means detects that the rotational speed of the drive gear is less than a predetermined rotational speed, the brake actuation detecting means detects actuation of a vehicle brake and the shift-range detecting means detects that a shift range is in a range other than the neutral range, the control means outputs the actuating signal to the PTO actuating unit in response to the ON signal from the PTO switch.

In accordance with the third aspect of the present invention, the control means makes it possible to actuate the PTO apparatus in response to the ON signal from the PTO switch only when the automatic transmission is in a range other than neutral, the vehicle is at rest owing to vehicle braking and the drive gear is substantially stopped.

Thus, in accordance with the first aspect of the invention, even if the PTO apparatus is operating, the PTO apparatus is stopped automatically when the vehicle starts traveling. This eliminates the aforementioned hazardous condition in which the driver causes the vehicle to travel while mistakenly leaving the PTO apparatus in an operating state. As a result, an accident caused by operation of the PTO apparatus during vehicle travel can be prevented before it occurs. In accordance with the second aspect of the invention, it is possible to prevent a hazardous situation in which the PTO apparatus, stopped temporarily in response to travel of the vehicle, suddenly starts operating in response to stopping of the vehicle. In accordance with the third aspect of the invention, the PTO apparatus and the automatic transmission can be interconnected without hindrance.

In order to attain the second object according to a fourth aspect of the invention, there is provided a power take-off control system of a vehicular automatic transmission, comprising the following elements connected to a power take-off apparatus for taking off power from the automatic transmission by meshing a PTO gear with a drive gear of the automatic transmission: a PTO actuating unit for meshing and unmeshing the PTO gear and the driver gear, a PTO switch, shift-range detecting means, vehicle brake-actuation detecting means, vehicle speed detecting means, meshing detecting means for detecting meshing between the PTO gear and the drive gear, and control means, to which are inputted an ON signal from the PTO switch and detecting signals from each of the detecting means for outputting a range-changeover signal to an electronic control unit of the automatic transmission and an actuating signal to the PTO actuating unit, wherein the control means, upon receiving the ON signal from the PTO switch and a vehicle brake-actuation detection signal from the vehicle brake-actuation detecting means as input signals, determines that the vehicle is at rest based upon a vehicle-speed signal from the vehicle speed detecting means and determines that a prevailing shift range of the automatic transmission is a neutral range based upon the detection signal from the shift-range detecting means, outputs the range-changeover signal to the electronic control unit of the automatic transmission to place the shift range in a shift range other than neutral, then outputs the actuating signal to the PTO actuating unit to mesh the PTO gear and the drive gear and, when the detection signal from the meshing detecting means is received as an input, outputs the range changeover signal to the electronic control unit of the automatic transmission to place the shift range in the neutral range.

In accordance with the PTO control system of the fourth aspect of the invention, when the PTO switch is OFF, namely when the power take-off apparatus is not operating, the PTO actuating unit assumes the deactuated state so that the PTO gear and the drive gear are unmeshed.

When the PTO switch is turned on and the power take-off apparatus is operating, the control means determines, based upon detection signals from the vehicle brake-actuation detecting means and the vehicle speed detecting means, whether the vehicle brake is being actuated and whether the vehicle is at rest. In order to stop rotation of the drive gear to make possible the meshing of this gear with the PTO gear when the prevailing shift range of the automatic transmission is the neutral range at such time that actuation of the vehicle brake and stopping of the vehicle have been determined, the control means causes the PTO actuating unit to mesh the PTO gear and the drive gear after it outputs the range-changeover signal to the electronic control unit of the automatic transmission to place the shift range in a range other than neutral, or immediately when the prevailing shift range is already in a range other than neutral.

When completion of meshing between the PTO gear and the drive gear is detected by the meshing detecting means, the control means outputs the range-changeover signal to the electronic control unit of the automatic transmission to automatically place the shift range in the neutral range, and actuates the PTO apparatus to perform power take-off.

Thus, in accordance with the present invention as described above, a troublesome shift operation of the kind encountered in the prior art need not be performed when the PTO apparatus is actuated. If the PTO switch is ON in a state where the vehicle is at rest, the PTO apparatus can be placed in the usable state automatically regardless of the shift range in which the automatic transmission presently resides.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
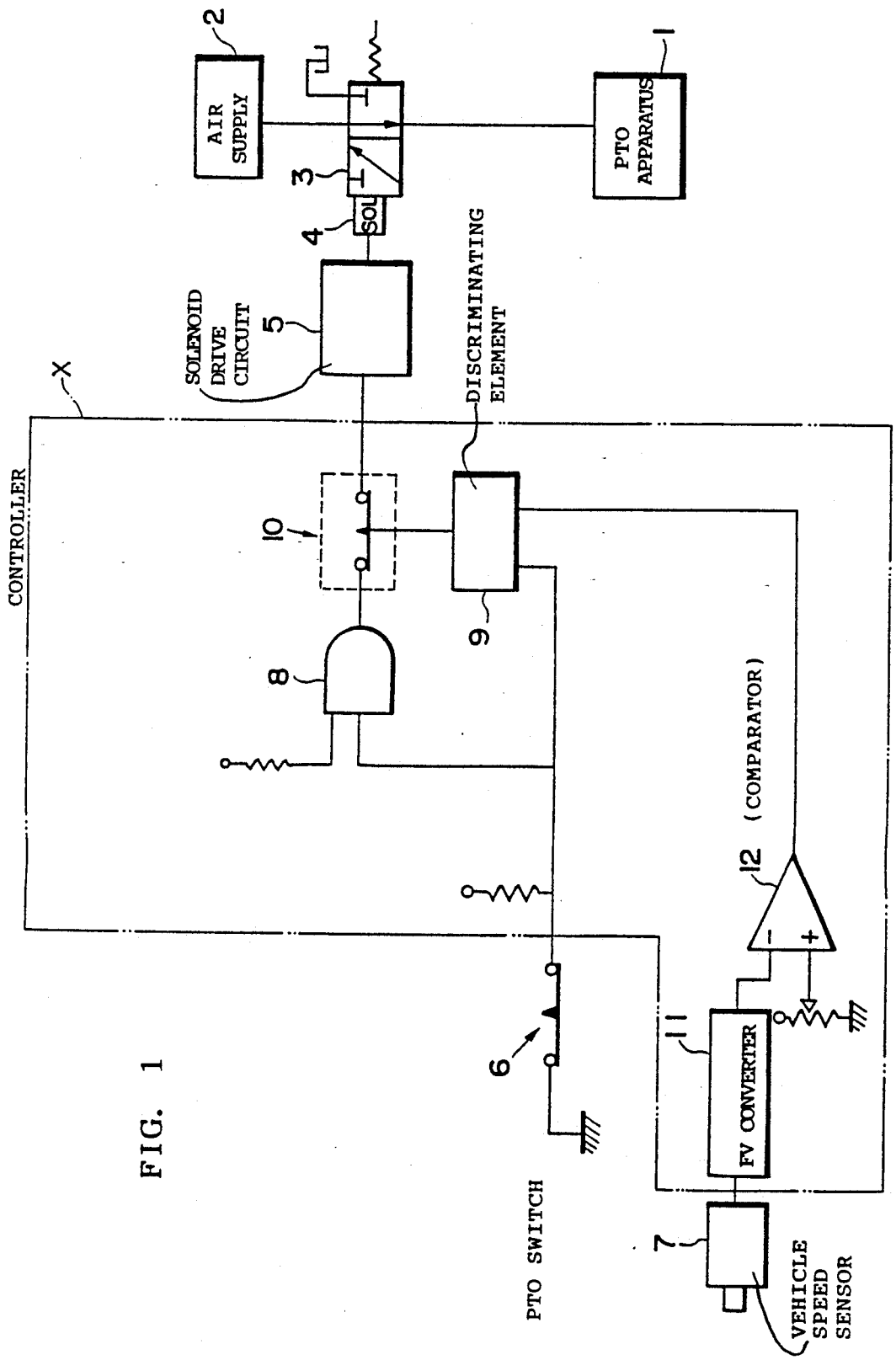
FIG. 1 is a control circuit diagram illustrating a first embodiment of the present invention.

With reference first to FIG. 1, there is shown a PTO apparatus 1 to which an air supply device 2 is connected. The PTO apparatus 1 is coupled to an automatic transmission by compressed air supplied by the air supply device 2, thereby taking off power from the transmission.

Figure 2:
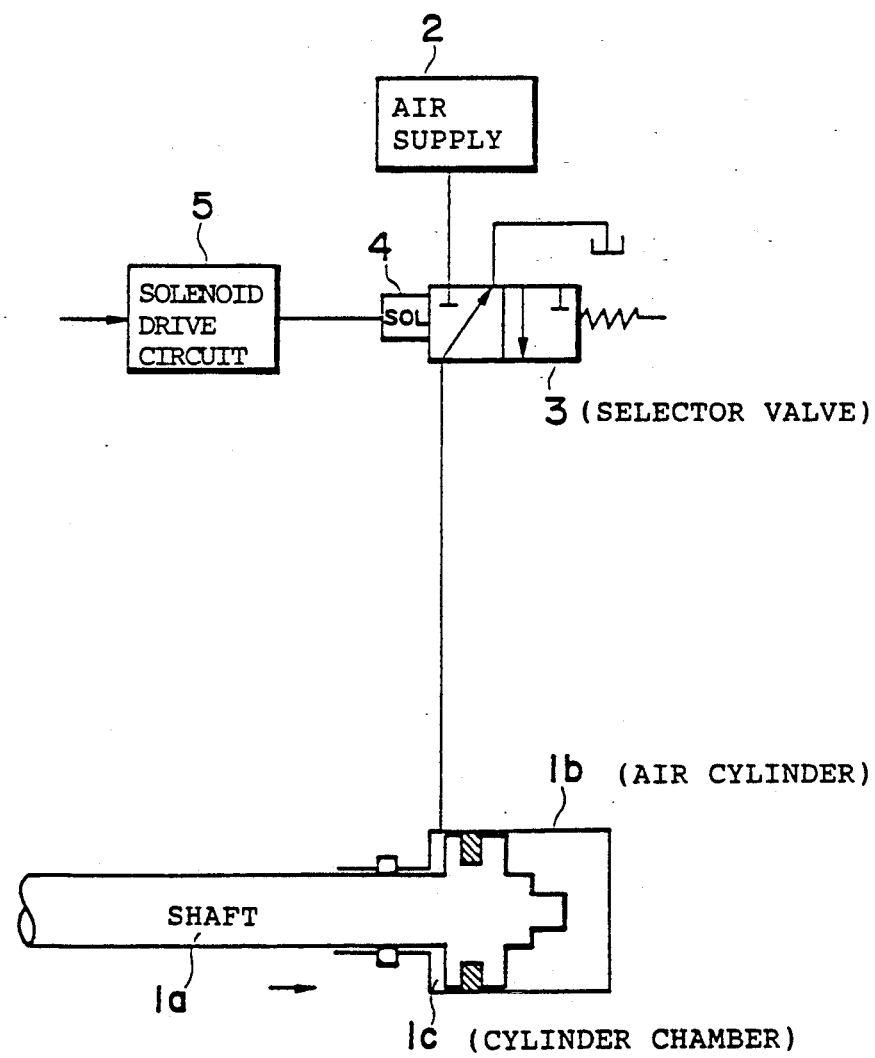
FIG. 2 is a control circuit diagram illustrating a second embodiment of the present invention.

As shown in FIG. 2, the coupling between the PTO apparatus 1 and the automatic transmission is accomplished in the following manner: A shaft 1$a$ is connected to a PTO gear 1A of the PTO apparatus 1 and is adapted to slide in the axial direction. An air cylinder 1$b$ is attached to the end portion of the shaft 1$a$. The compressed air from the air supply device 2 is supplied to the interior of the cylinder chamber 1$c$ so that the shaft 1$a$ slides to the right in FIG. 2, thereby meshing the PTO gear 1$a$ with the drive gear B1. As a result, the PTO apparatus and the automatic transmission are coupled to each other.

A selector valve 3 is connected between the PTO apparatus 1 and the air supply device 2 and is changed over by actuating a solenoid 4, thereby supplying compressed air from the air supply device 2 to the PTO apparatus 1. The solenoid 4 is adapted to be actuated by a solenoid drive circuit 5, which is connected to a controller (control means) X.

The air supply device 2, selector valve 3, solenoid 4 and solenoid drive circuit 5 construct a PTO actuating unit.

A PTO switch 6, which is provided at the driver's seat, and a vehicle speed sensor (vehicle speed detecting means) 7 are connected to the controller X.

The PTO switch 6 is connected to an input terminal of an AND (gate) circuit 8 and a discriminating element 9 in the controller X. The output terminal of the AND circuit 8 is connected to the solenoid drive circuit 5 via a switch 10 adapted to be turned on and off by the discriminating element 9. Another input terminal of the AND circuit 8 is connected, e.g., to an ignition switch.

The vehicle speed sensor 7 is connected to an FV converter 11 of the controller X, and the FV converter 11 is connected to an inverted (−) terminal of a comparator 12. The output terminal of the comparator 12 is connected to the discriminating element 9.

When the PTO switch 6 is turned on in the control system of FIG. 1, an ON signal from the PTO switch 6 enters the input terminal of the AND circuit 8, which responds by delivering an actuating signal to the solenoid drive circuit 5 via the switch 10. In response to input of the actuating signal, the solenoid drive circuit 5 turns on the solenoid 4, which changes the selector valve 3 to the state shown in FIG. 1. As a result, compressed air from the supply device 2 is supplied to the PTO apparatus 1, thereby connecting the PTO apparatus to the automatic transmission to perform power take-off. When the PTO switch is turned off, a signal from the PTO switch 6 no longer enters the AND circuit 8. Consequently, the actuating signal is no longer delivered to the solenoid drive circuit 5 and the solenoid is turned off. As a result, the selector valve 3 is changed over from the state of FIG. 1 to cut off the supply of compressed air from the air supply device 2 to the PTO apparatus 1, thereby disconnecting the PTO apparatus 1 and the automatic transmission.

Further, a vehicle-speed signal indicative of vehicle speed sensed by the vehicle speed sensor 7 enters the FV converter 11, in which a conversion is made from rotational speed to electric potential. The comparator 12 compares this output potential with a preset potential and outputs a positive potential to the discriminating element 9 when the potential from the FV converter is greater than the present potential, namely when the vehicle speed is greater than a fixed vehicle speed.

When the positive potential from the comparator 12 is applied thereto, the discriminating element 9 turns off the switch 10, thereby cutting off the actuating signal from the AND circuit 8. Accordingly, even if the PTO switch 6 is turned on during vehicle travel at a speed greater than the fixed speed, the selector valve 3 is changed over and the compressed air bleeds from the PTO apparatus 1. As a result, the PTO apparatus 1 will not operate.

Once there is a potential input from the comparator 12 and the ON signal from the PTO switch 6 enters the discriminating element 9, the switch 10 is made to remain in the OFF state while the ON signal from the PTO switch 6 is entering the discriminating element. Accordingly, if the vehicle starts traveling during operation of the PTO apparatus 1 and the vehicle speed exceeds a fixed vehicle speed, the switch 10 is turned off and the PTO apparatus 1 is deactuated. Thereafter, the PTO apparatus 1 will not start operating again even if the vehicle is brought to a stop.

In a case where the PTO apparatus 1 is to be actuated again, the input of the ON signal from the PTO switch 6 to the discriminating element 9 will vanish once the PTO switch 6 is turned off, and therefore the discriminating element 9 will turn on the switch 10 to place the PTO apparatus 1 in a state in which it is capable of being actuated. Therefore, it will suffice to turn on the PTO switch 6 to actuate the PTO apparatus 1.

Figure 3:
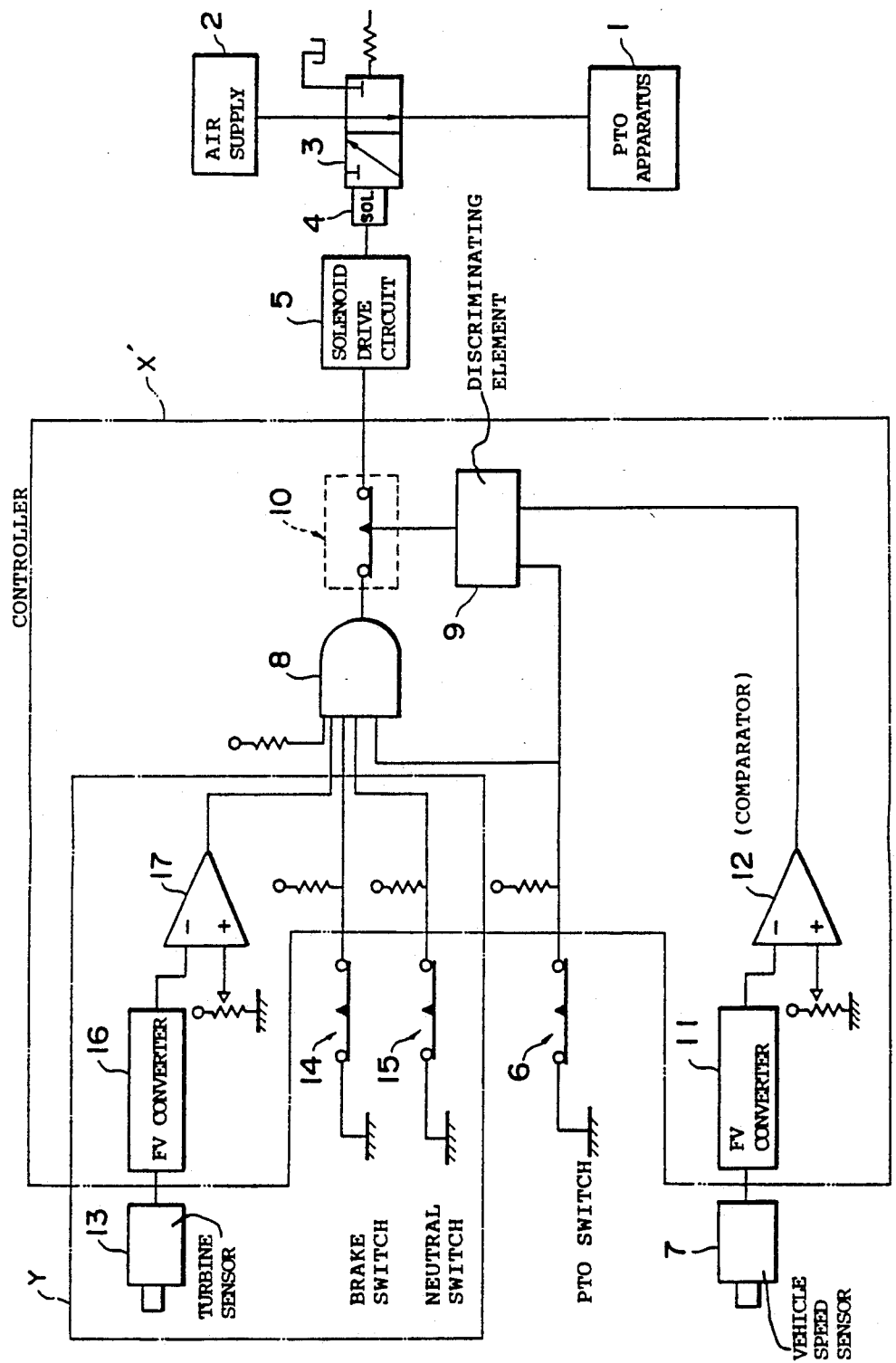
FIG. 3 is a control circuit diagram illustrating a third embodiment of the present invention.

FIG. 3 illustrates another embodiment of the present invention, in which portions identical with those of the first embodiment of FIG. 1 are designated by like reference characters. To an input terminal of the AND circuit 8 is connected, e.g., an ignition switch.

As shown in FIG. 3, the following elements are connected to the controller (control means), here designated at X': a turbine sensor (means for detecting the rotational speed of the drive gear) 13 for sensing the rotational speed of the drive gear B1 of the automatic transmission, a brake switch (brake actuation detecting means) 14, and a neutral switch (shift range detecting means) 15, in addition to the elements described in the embodiment of FIG. 1.

The turbine sensor 13 is connected to an FV converter 16 of the controller X', and the FV converter 16 is connected to an inverted (−) terminal of a comparator 17, the output side of which is connected to the input terminal of the AND circuit 8. The brake switch 14 and the neutral switch 15 are connected to respective input terminals of the AND circuit 8. The neutral switch 15 is turned on when the automatic transmission is in a range other than the neutral range, and is turned off when the automatic transmission is in the neutral range. Other portions are similar to those of the embodiment shown in FIG. 1.

In the control apparatus shown in FIG. 3, the rotational speed of the drive gear B1 of the automatic transmission sensed by the turbine sensor 13 is converted into a potential by the FV converter 16, which applies the potential to the comparator 17. The comparator 17 compares the potential arriving from the FV converter 16 with a preset potential and delivers a positive potential to the AND circuit 8 when the potential from the FV converter 16 is less than the set potential, namely when the drive gear B1 substantially stops rotating.

When the ON signal from the PTO switch 6 enters the AND circuit 8 in a state where the positive potential from the comparator 17 and ON signals from the brake switch 14 and neutral switch 15 are being applied thereto, the AND circuit 8 outputs the actuating signal to the solenoid drive circuit 5 via the switch 10. More specifically, actuation of the PTO apparatus 1 is made in response to an ON signal from the PTO switch 6 only when the automatic transmission is in a range other than neutral, the vehicle is stopped and the drive gear B1 is at rest owing to application of the vehicle brake.

If the vehicle starts traveling during operation of the PTO apparatus 1, the discriminating element 9 turns off the switch 10 to halt operation of the PTO apparatus 1 in response to detection of vehicle speed by the vehicle speed sensor 7, just as in the embodiment of FIG. 1.

The portion designated by Y in the arrangement of FIG. 3 is used only when operation of the PTO apparatus 1 starts; it is not used during operation of the PTO apparatus 1.

In the embodiments of FIGS. 1 and 3, the changeover of the PTO apparatus 1 is carried out by air pressure. However, this can be accomplished using hydraulic pressure if desired.

Figure 4:
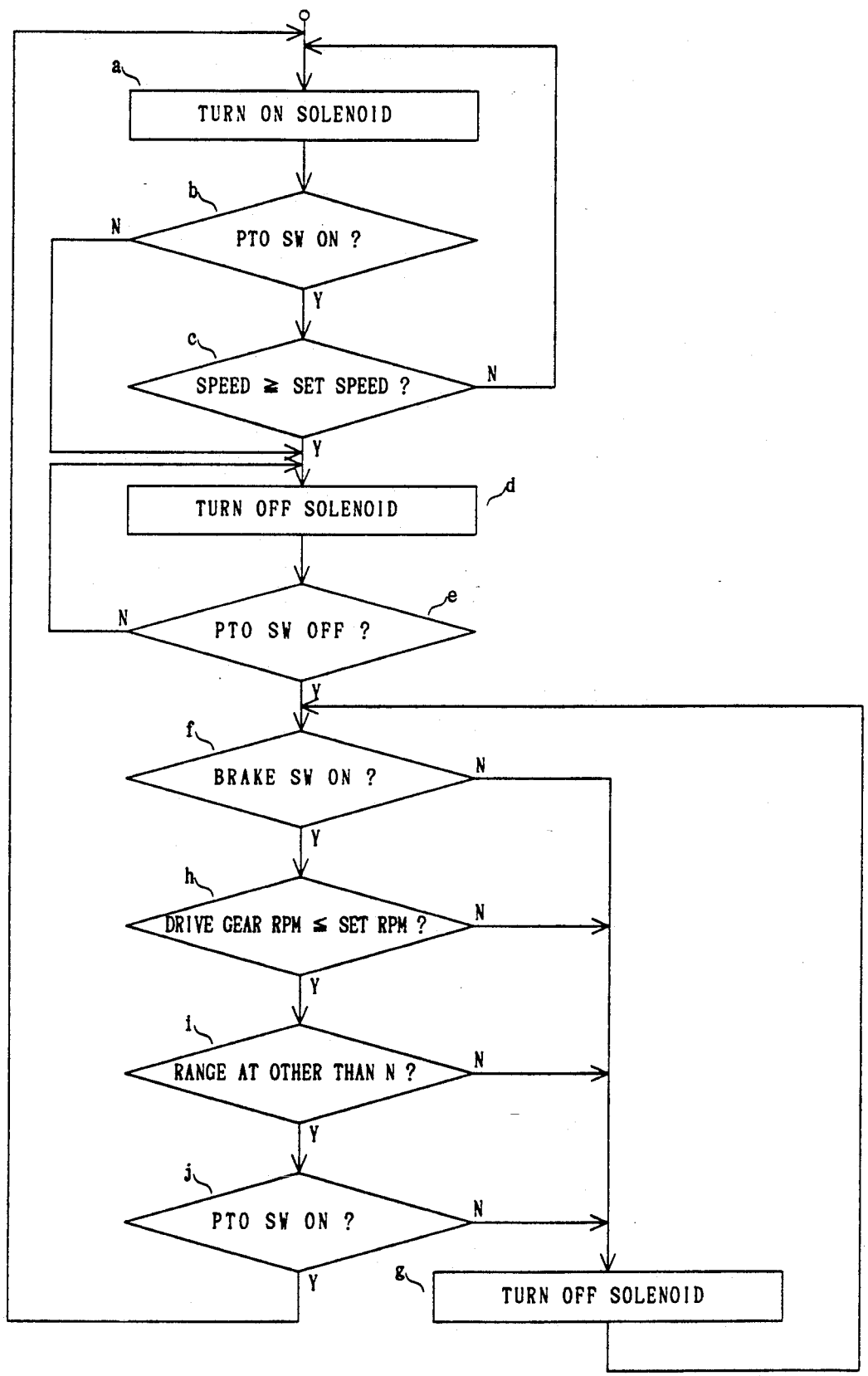
FIG. 4 is a flowchart illustrating a fourth embodiment of the present invention.

Further, the controllers X, X' in the embodiments of FIGS. 1 and 3 may employ a computer for automatic transmission (ATM) control. FIG. 4 is a flowchart illustrating actuation control of the PTO apparatus 1 in such an ATM control computer in a case where the ATM control computer is used instead of the controller X' of the embodiment shown in FIG. 3.

In FIG. 4, when the solenoid 4 has been turned on and the PTO apparatus 1 is operating (step a), the discriminating element determines whether the PTO switch 6 is on or off (step b). When the PTO switch 6 is off, output of the actuating signal to the solenoid 4 is turned off (step d). If the discriminating element determines that the PTO switch 6 is on at step b, then the discriminating element determines, based upon the vehicle-speed signal from the vehicle speed sensor 7, whether the vehicle speed at this time is greater than a set vehicle speed (step c). If the vehicle speed is less than the set vehicle speed, the output of the actuating signal to the solenoid drive circuit 5 is maintained. If the vehicle speed is greater than the set vehicle speed, the output of the actuating signal to the solenoid drive circuit 5 is halted and the solenoid 4 is turned off (step d). As a result, the PTO apparatus 1 is deactuated.

Next, in a state where the solenoid 4 is off and the PTO apparatus 1 is not operating, the discriminating element determines whether the PTO switch 6 is off (step e). When the PTO switch 6 is not off, the solenoid valve 4 is kept off (step d). As a result, once operation of the PTO apparatus 1 has been halted owing to travel of the vehicle, the PTO apparatus 1 will not start operating again even if the vehicle is subsequently stopped.

IN a case where the PTO apparatus 1 is to be actuated again, the PTO switch 6 is turned off. When the OFF state of the PTO switch 6 is discriminated by the discriminating element (step e), the latter determines whether the brake switch 14 is on or not (step f). When the brake switch 14 is off, the solenoid 4 is kept off (step g). When the brake switch 14 is on, the discriminating element then determines, based upon the detection signal from the turbine sensor 13, whether the rotational speed of the drive gear B1 of the automatic transmission is less than the set rotational speed (step h).

When the rotational speed of the drive gear B1 is greater than the set rotational speed, the solenoid 4 is kept off (step g). When the rotational speed of the drive gear B1 is less than the set rotational speed, the discriminating element then determines, based upon the ON signal from the neutral switch 15, whether the shift range of the automatic transmission at this time is a range other than neutral (step i).

When the prevailing shift range is the neutral range, the solenoid 4 is kept off (step g). When the prevailing shift range is the range other than neutral, the discriminating element determines whether the PTO switch 6 is on (step j). When the PTO switch 6 is on, the actuating signal is outputted to the solenoid drive circuit 5, thereby turning on the solenoid 4 to start operation of the PTO apparatus 1.

In other words, actuation of the PTO apparatus is made possible in response to an ON signal from the PTO switch only when the automatic transmission is in a range other than neutral, the vehicle has been stopped by the vehicle brake and the drive gear is at rest.

Figure 5:
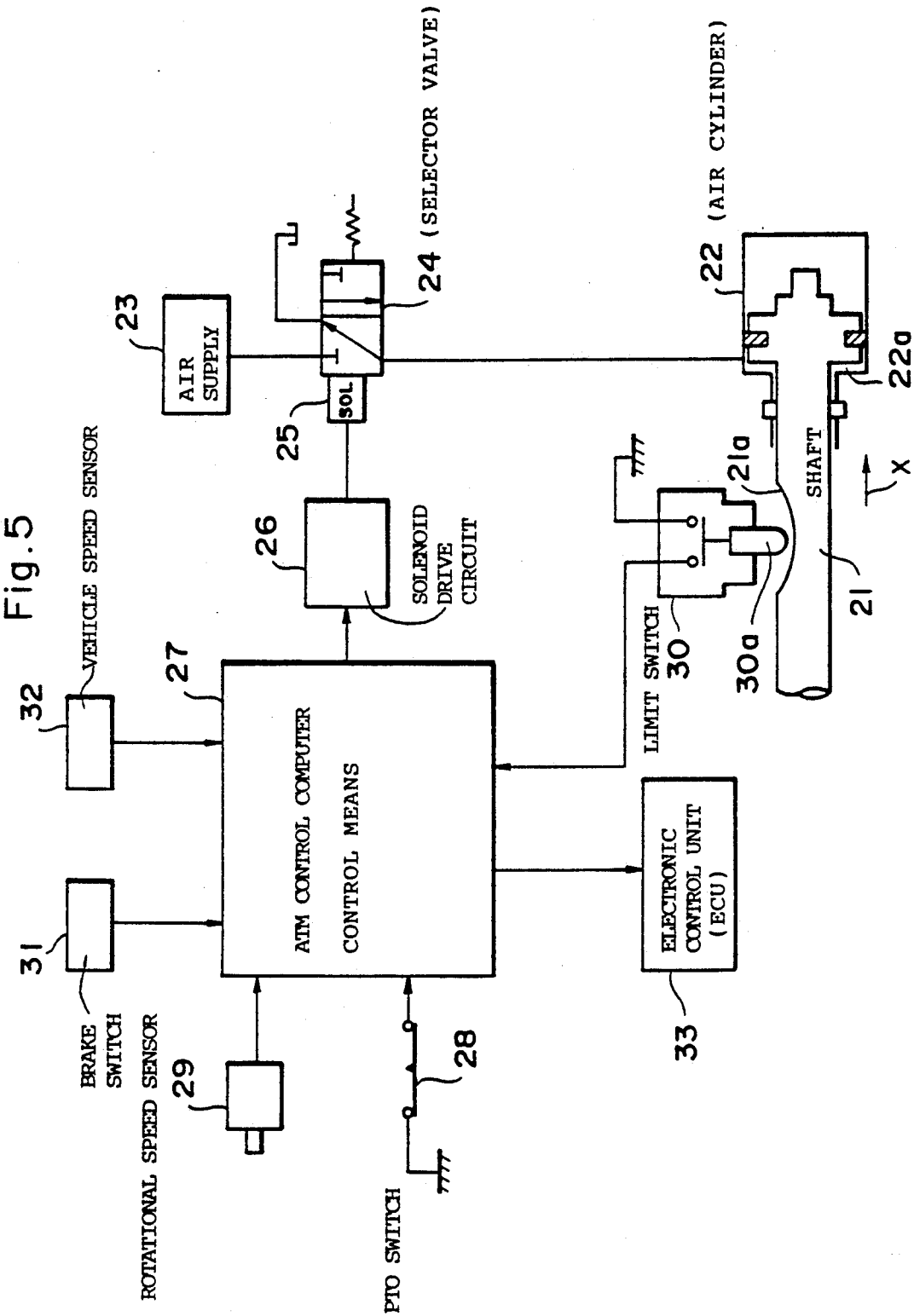
FIG. 5 is a control circuit diagram illustrating a fifth embodiment of the present invention.
Figure 7:
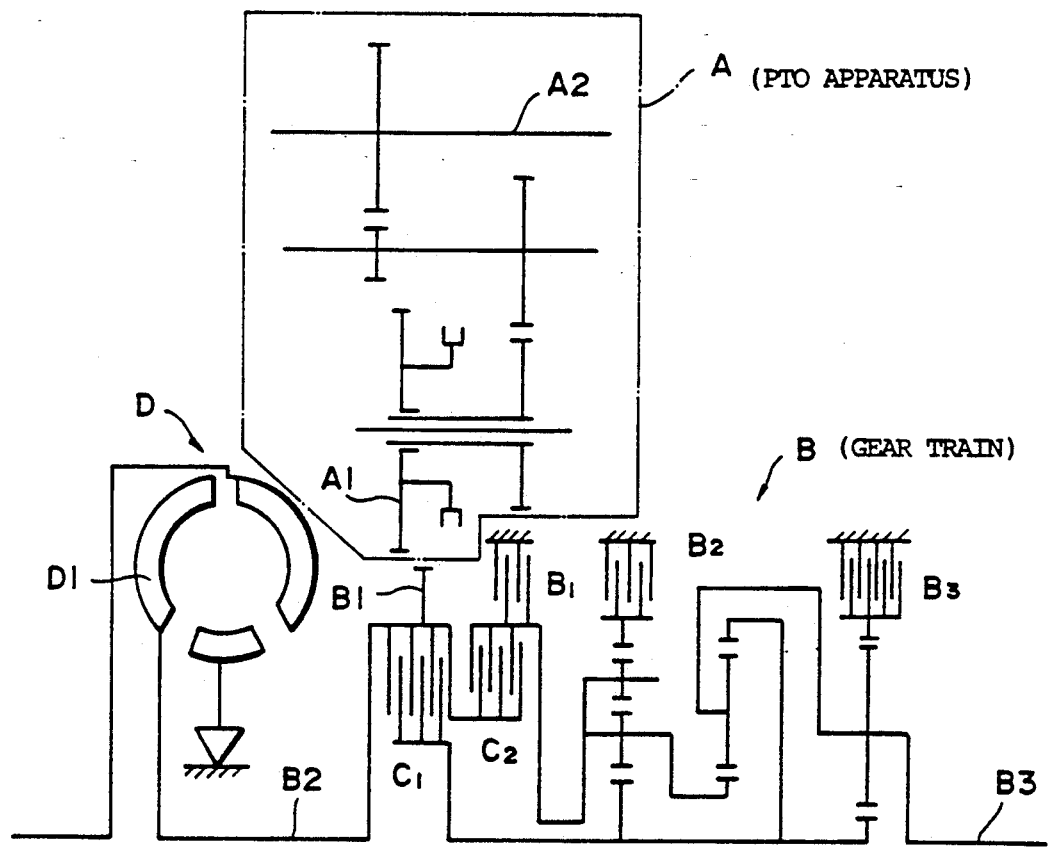
FIG. 7 is a skeleton diagram showing a PTO apparatus according to the prior art.

FIG. 5 illustrates a fifth embodiment of the PTO control system of the invention connected to the PTO apparatus A shown in FIG. 7. Numeral 21 denotes a shaft connected to the PTO gear A1 of the PTO apparatus and slid in the axial direction to mesh the PTO gear A1 with the drive gear B1 of the automatic transmission. An air cylinder 22 is attached to the end portion of the shaft 21. Compressed air from an air supply device 23 is supplied to the interior of the cylinder chamber 22a so that the shaft 21 slides to the right (in the direction of arrow X) in FIG. 5, thereby meshing the PTO gear A1 with the drive gear B1. As a result, the PTO apparatus and the automatic transmission are coupled to each other.

A selector valve 24 is connected between the air cylinder 22 and the air supply device 23 and is changed over by actuating a solenoid 25, thereby switchingly communicating the cylinder chamber 22a of air cylinder 22 with the air supply device 23 or the atmosphere.

A solenoid drive circuit 26 to which the solenoid 25 is connected controls the on/off action of the solenoid 25 by an actuating signal from an ATM control computer (control means) 27. When the actuating signal from the ATM control computer 27 is a positive potential, the solenoid 25 is turned on to interconnect the air supply device 23 and the cylinder chamber 22a.

It should be noted that the shaft 21, air cylinder 22, air supply device 23, selector valve 24, solenoid 25 and solenoid drive circuit 26 construct a PTO actuating unit.

The ATM control computer 27 delivers the actuating signal to the solenoid drive circuit 26 upon receiving, as inputs thereto, an ON signal from a PTO switch 28 provided at the driver's seat, a rotational speed-detection signal from a sensor (shift-range detecting means) 29 mounted on the automatic transmission for detecting the rotational speed of the drive gear B1, a limit signal from a limit switch (meshing detecting means) 30 mounted on the shaft 21, a brake actuation signal from a brake switch (vehicle brake-actuation detecting means) 31 attached to the brake pedal, and a vehicle speed signal from a vehicle speed sensor (vehicle speed detecting means) 32.

The limit switch 30 has a contactor 30a situated in a recess 21a formed in the shaft 21. When the shaft 21 slides rightward in FIG. 5 to mesh the PTO gear A1 and the drive gear B1, the contactor 30a engages the recessed surface of the recess 21a, thereby closing the limit switch 30. As a result, the limit switch 30 outputs an ON signal to the ATM control computer 27.

Figure 6:
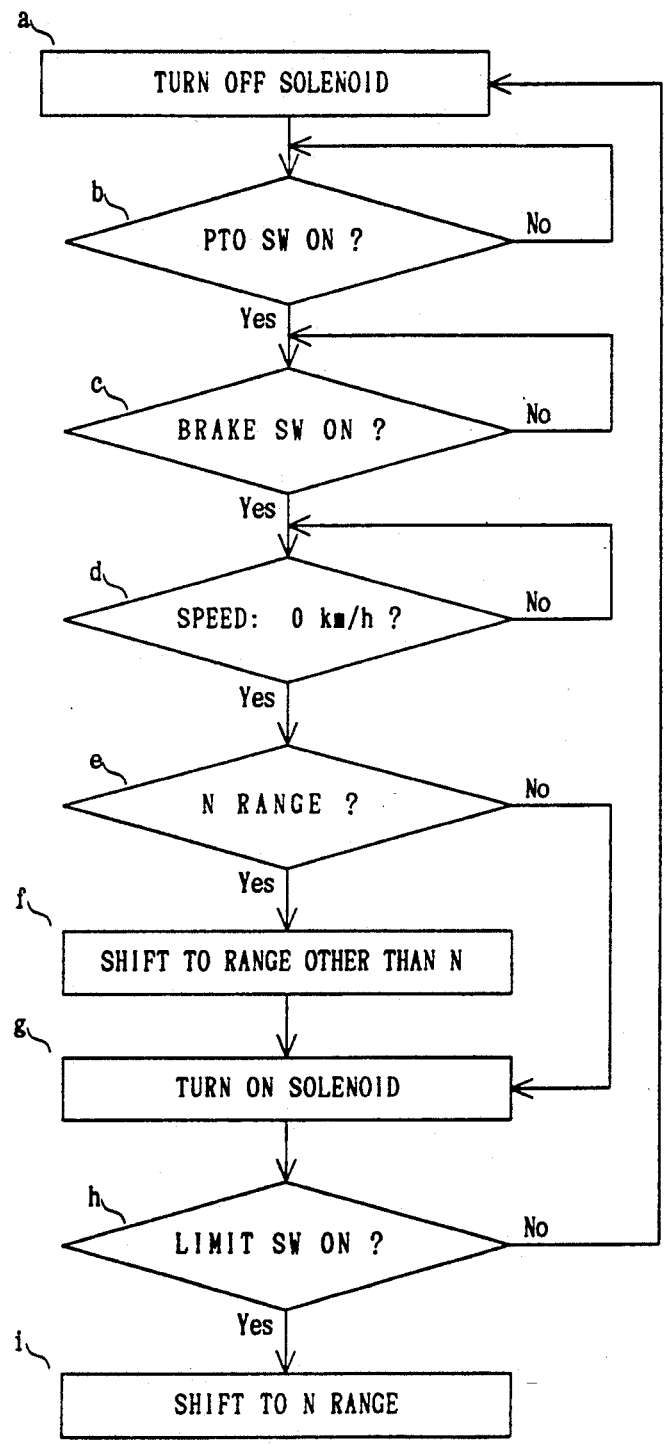
FIG. 6 is a flowchart illustrating PTO control in the same embodiments.

Control for driving the PTO apparatus according to the PTO control system set forth above will now be described based upon the flowchart shown in FIG. 6.

With the solenoid 25 in the OFF state (step a), the selector valve 24 communicates the cylinder 22a of the air cylinder 22 with the atmosphere. In addition, the compressed air from the air supply device 23 is cut off and is not supplied to the cylinder chamber 22a. Consequently, the shaft 21 is situated at the position shown in FIG. 5 and the PTO gear A1 is not in mesh with the drive gear B1. The limit switch 30 is off.

When the PTO apparatus is to be driven, the ATM control computer 27 determines whether the PTO switch 28 is on (step b). If an ON signal is entering from the PTO switch 28, then the computer 27 determines whether the brake switch 31 is on (step c). When the brake switch 31 is on, the computer 27 then determines, based upon the vehicle-speed signal from the vehicle speed sensor 32, whether the vehicle is at rest (i.e., when the vehicle speed is 0 km/h). The computer 27 then determines, based upon the signal indicative of rotational speed of the drive gear sensed by the rotational speed sensor 29, whether the shift range at this time is the neutral range (step e).

When the prevailing shift range is determined to be the neutral range at step e, the ATM control computer 27 outputs a shift signal to a shifting solenoid valve (not shown) connected to an electronic control unit 33 of the automatic transmission, thereby changing over the shift range to a range other than neutral (step f). After this change over at step f, or immediately when the shift range is found to be in a range other than neutral at step e, the ATM control computer 27 outputs a positive-potential actuating signal to the solenoid drive circuit 26, thereby turning on the solenoid 25 (step g.).

The selector valve 24 is changed over in response to turn-on of the solenoid 25, so that the air supply device 23 supplies compressed air to the interior of the cylinder chamber 22a. As a result, the shaft 21 is slid in the direction of arrow X (rightward) in FIG. 6 to mesh the PTO gear A1 and the drive gear B1 in order to drive the PTO apparatus A.

Next, the ATM control computer 27 determines whether the limit switch 30 has been turned on by sliding of the shaft 21 toward the side for driving the PTO apparatus (i.e., in the X direction) (step h). When an ON signal enters from the limit switch 30, the computer 27 determines that meshing of the PTO gear A1 and drive gear B1 has been completed and outputs the shift signal to the electronic control unit 33 of the automatic transmission, thereby shifting the shift range of the transmission to the neutral range.

In the foregoing embodiment, the changeover of the PTO apparatus A is carried out by air pressure. However, this can be accomplished using hydraulic pressure if desired.

As many apparently widely different embodiments of the present invention can be made without departing from the spirit and scope thereof, it is to be understood that the invention is not limited to the specific embodiments thereof except as defined in the appended claims.

What is claimed is:

1. A control system of a power take-off apparatus for taking off power from an automatic transmission by meshing a PTO gear with a drive gear of the automatic transmission, comprising:
    a PTO switch;
    vehicle speed detecting means for detecting vehicle speed; and
    control means, to which are inputted an ON signal from said PTO switch and a vehicle-speed signal from said vehicle speed detecting means, for outputting an actuating signal to an actuating unit of the power take-off apparatus;
    said control means actuating the power take-off apparatus by outputting the actuating signal to the actuating unit of the power take-off apparatus in response to an input of the ON signal from said PTO switch, and stopping the output of the actuating signal when said vehicle speed detecting means detects that the vehicle speed is greater than a predetermined vehicle speed which is more than zero during output of the actuating signal.

2. The control system according to claim 1, wherein said control means is so adapted that upon stopping the output of the actuating signal in response to detection of a vehicle speed greater than the predetermined vehicle speed during the output of the actuating signal, the control means continues to stop the output of the actuating signal even if said vehicle speed detecting means detects that the vehicle speed has fallen below the predetermined vehicle speed.

3. The control system according to claim 2, wherein said control system further comprises:
    rotational speed detecting means, connected to said control means, for detecting rotational speed of the drive gear;
    brake actuation detecting means, connected to said control means, for detecting brake actuation; and
    shift-range detecting means, connected to said control means, for detecting a shift-range;
    wherein when said rotational speed detecting means detects that the rotational speed of the drive gear is less than a predetermined rotational speed, said brake actuation detecting means detects actuation of a vehicle brake and said shift-range detecting means detects that the shift range is in a range other than a neutral range, said control means outputting the actuating signal to the PTO actuating unit in response to the ON signal from said PTO switch.

4. The control system according to claim 3, wherein said control means comprises an ATM control computer which executes processing steps that comprise:
    a first step of determining whether said PTO switch is on or off;
    a second step of determining whether the vehicle speed is greater than a set vehicle speed when said PTO switch is on, thereupon providing a signal for maintaining the output of the actuating signal to the PTO actuating unit when the vehicle speed is less than the set vehicle speed, or providing a signal for stopping the output of the actuating signal to the PTO actuating unit when the vehicle speed is greater than the set vehicle speed;

a third step of determining whether said PTO switch is OFF, thereupon maintaining the signal for stopping the output of the actuating signal to the PTO actuating unit when the PTO switch is not OFF; and when said PTO switch is OFF, said ATM control computer further executes the processing steps of:
(i) determining whether the brake is OFF,
(ii) determining whether the drive gear rotational speed is less than the predetermined rotational speed,
(iii) determining whether the shift range is not at the neutral range, and
(iv) determining whether the PTO switch is ON, whereupon a signal is outputted for maintaining the PTO at a nonactuated state, when said further processing steps (i) to (iv) are not satisfied.

5. The control system according to claim 2, wherein said control means comprises an ATM control computer which executes processing steps that comprise:
a first step of determining whether said PTO switch is on or off;
a second step of determining whether the vehicle speed is greater than a set vehicle speed when said PTO switch is on, thereupon providing a signal for maintaining the output of the actuating signal to the PTO actuating unit when the vehicle speed is less than the set vehicle speed, or providing a signal for stopping the output of the actuating signal to the PTO actuating unit when the vehicle speed is greater that the set vehicle speed; and
a third step of determining whether said PTO switch is OFF, thereupon maintaining the signal for stopping the output of the actuating signal to the PTO actuating unit when the PTO switch is not OFF.

6. The control system according to claim 1, wherein said control means comprises an ATM control computer which executes processing steps that comprise:
a first step of determining whether said PTO switch is on or off;
a second step of determining whether the vehicle speed is greater than a set vehicle speed when said PTO switch is on, thereupon providing a signal for maintaining the output of the actuating signal to the PTO actuating unit when the vehicle speed is less than the set vehicle speed, and providing a signal for stopping the output of the actuating signal to the PTO actuating unit when the vehicle speed is greater than the set vehicle speed.

7. A power take-off control system of a vehicular automatic transmission connected to a power take off apparatus for taking off power from the automatic transmission by meshing a PTO gear with a drive gear of the automatic transmission, the system comprising:
a PTO actuating unit for meshing and unmeshing the PTO gear and the drive gear;
a PTO switch;
shift-range detecting means for detecting a shift-range;
vehicle brake-actuation detecting means for detecting vehicle brake-actuation;
vehicle speed detecting means for detecting vehicle speed;
meshing detecting means for detecting meshing between the PTO gear and the drive gear; and
control means, to which are inputted an ON signal from said PTO switch and detecting signals from each of said detecting means, for outputting a range-changeover signal to an electronic control unit of the automatic transmission and an actuating signal to said PTO actuating unit;
wherein said control means, upon (a) receiving the ON signal from said PTO switch and a vehicle brake-actuation detection signal from said vehicle brake-actuation detecting means as input signals, (b) determining that the vehicle is at rest based upon a vehicle-speed signal from said vehicle speed detecting means and (c) determining that a prevailing shift range of the automatic transmission is a neutral range based upon the detection signal from said shift-range detecting means, outputs the range-changeover signal to the electronic control unit of the automatic transmission to place the shift range in a shift range other than neutral, then outputs the actuating signal to said PTO actuating unit to mesh the PTO gear and the drive gear, when the detection signal from said meshing detecting means is received as an input, outputs the range-changeover signal for changing over to the neutral range.

8. The control system according to claim 7, wherein said control means comprises an ATM control computer which executes processing steps that include:
a first step of determining whether said PTO switch is on:
a second step of determining whether the vehicle is at rest based upon the vehicle-brake actuation signal from said vehicle-brake actuating means and the vehicle-speed signal from said vehicle speed detecting means;
a third step of determining, based upon the detection signal from said shift-range detecting means when the vehicle is at rest, whether the shift range of the automatic transmission at this time is in the neutral range;
a fourth step of outputting an actuating signal to said PTO actuating unit for meshing the PTO actuating unit and the drive gear after changing over to a shift range other than the neutral range by outputting the range-changeover signal to the electronic control unit of the automatic transmission when the shift range is at the neutral range; and
a fifth step of outputting the range-changeover signal to the electronic control unit of the automatic transmission for changing over the shift range to the neutral range when the detection signal is inputted from said meshing detecting means.

9. The control system according to claim 7, wherein said meshing detecting means comprises a limit switch provided on said PTO actuating unit.

* * * * *